United States Patent
Dall

(10) Patent No.: US 7,383,471 B2
(45) Date of Patent: Jun. 3, 2008

(54) DIAGNOSTIC MEMORY DUMPING

(75) Inventor: Elizabeth Jane Dall, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 637 days.

(21) Appl. No.: 11/023,895

(22) Filed: Dec. 28, 2004

(65) Prior Publication Data

US 2006/0143534 A1 Jun. 29, 2006

(51) Int. Cl.
G06F 11/00 (2006.01)

(52) U.S. Cl. ..................................................... 714/38

(58) Field of Classification Search ................. 714/38, 714/37, 6, 15, 20, 25, 47; 717/124, 127, 717/128, 154
See application file for complete search history.

(56) References Cited

U.S. PATENT DOCUMENTS

| | | | | |
|---|---|---|---|---|
| 5,884,019 | A * | 3/1999 | Inaho | 714/6 |
| 6,601,188 | B1 * | 7/2003 | Wilding | 714/15 |
| 6,779,132 | B2 * | 8/2004 | Andress et al. | 714/24 |
| 2003/0120968 | A1 * | 6/2003 | Andress et al. | 714/25 |
| 2005/0240806 | A1 * | 10/2005 | Bruckert et al. | 714/6 |
| 2006/0041739 | A1 * | 2/2006 | Iwakura et al. | 713/2 |
| 2006/0136784 | A1 * | 6/2006 | Prescott et al. | 714/38 |

FOREIGN PATENT DOCUMENTS

| | | | |
|---|---|---|---|
| JP | 55004677 | A | 1/1980 |
| JP | 63211443 | A | 9/1988 |
| JP | 63211444 | A | 9/1988 |
| JP | 02064750 | A | 3/1990 |
| JP | 02109147 | A | 4/1990 |
| JP | 02186451 | A | 7/1990 |
| JP | 02304640 | A | 12/1990 |
| JP | 03215237 | A | 5/1991 |
| JP | 03257641 | A | 11/1991 |
| JP | 04342013 | A | 11/1992 |
| JP | 04342041 | A | 11/1992 |
| JP | 05002547 | A | 1/1993 |
| JP | 07325738 | A | 12/1995 |
| JP | 08328914 | A | 12/1996 |
| JP | 10143373 | A | 5/1998 |
| JP | 2000137630 | A | 5/2000 |

* cited by examiner

Primary Examiner—Nadeem Iqbal

(57) ABSTRACT

A computer-implemented method is disclosed which includes steps of: (A) receiving a memory dump request from a first operating system executing in a computer; and (B) at a program executing in the computer and not forming a part of the first operating system, copying contents of a memory of the computer to a persistent storage device in response to the memory dump request.

27 Claims, 4 Drawing Sheets

DIAGNOSTIC MEMORY DUMPING

BACKGROUND

An operating system is a software program or collection of software programs that execute on a computer to provide a platform on which application programs can execute. Well-known examples of operating systems include the UNIX operating system (including variants such as the HP-UX® operating system), the Microsoft® Windows® family of operating systems, and the Apple® Mac OS® operating system. Because the operating system of a computer performs essential functions required for the proper operation of other software executing on the computer, the operating system must be as robust as possible. Despite the best efforts of operating system designers, however, an operating system may "crash" or experience other errors due to a defect in the operating system or some other problem. An operating system crash typically causes all other software on the computer to cease executing and requires the computer to be rebooted. Lesser errors may not require a reboot but may nonetheless cause other problems, such as the temporary inability to access a peripheral device.

It is desirable to identify the causes of operating system crashes and other errors so that any bugs in the operating system may be fixed, thereby reducing or eliminating the possibility of future errors. Typically, the first step in identifying the cause of an operating system error is for the computer to "dump" (copy) the contents of the computer's random access memory (RAM) to a storage device (such as a hard disk drive). For example, referring to FIG. 1, a block diagram is shown of a conventional computer 100 including an operating system 102 and a hardware layer 108. The hardware layer 108 includes one or more processors 110, a memory 112, and one or more input/output (I/O) devices 114. The operating system 102 includes a dump module 106 for dumping the contents of memory 112 to one of the I/O devices 114 (such as a hard disk drive) upon detection of an operating system error. The contents of the memory dump may then be examined (automatically by a software program, manually by a programmer, or both) in an attempt to identify the cause of the error.

In conventional computer 100, the operating system 102 itself is responsible for performing a memory dump upon detection of an error. Because the operating system 102 has experienced an error, however, it may be in an unknown state which makes it unable to perform the memory dump correctly. Furthermore, the operating system 102, like many conventional operating systems, includes both conventional device drivers 104a and special "dump" device drivers 104b which are required for use by the dump module 106 during memory dumps due to the constraints imposed by the unknown state of the operating system 102. Programming such special device drivers 104b can be tedious and time-consuming. For example, such special device drivers 104b operate under constraints imposed by the unknown state of the operating system 102b, making them difficult to program and maintain. For example, the dump module 106 typically executes in a single thread. Furthermore, the driver's spinlocks may have been held at the time of the error, so device drivers 104b cannot assume that the I/O devices 114 are in a known state. The device drivers 104b which are used to perform memory dumps must be capable of operating under such restricted conditions.

Furthermore, conventional techniques for dumping memory impose constraints on the time at which memory dumping may be performed. For example, existing techniques cannot perform a memory dump very early in the process of loading the operating system 102 because the necessary I/O drivers 104b have not yet been loaded. Such techniques cannot, therefore, be used to perform a memory dump if an error occurs, or if a dump is desired for some other reason, before the necessary I/O drivers 104b have been loaded.

As the amount of memory in a single computer continues to increase, the amount of time required to dump such memory to a storage device continues to increase. Furthermore, the techniques that currently are used to perform memory dumps impose constraints that limit the speed at which the contents of memory may be dumped.

SUMMARY

A computer-implemented method is disclosed which includes steps of: (A) receiving a memory dump request from a first operating system executing in a computer; and (B) at a program executing in the computer and not forming a part of the first operating system, copying contents of a memory of the computer to a persistent storage device in response to the memory dump request.

DETAILED DESCRIPTION

Embodiments are disclosed for performing a dump of the memory space allocated to a first operating system using a dumping program that is independent of the first operating system and that executes on the same computer as the first operating system. The dumping program may, for example, be a second operating system executing on the same computer as the first operating system. For example, the first operating system may be one of a plurality of guest operating systems executing on the computer, and the dumping program may be a virtual machine monitor which provides an interface between the first operating system and a hardware layer of the computer.

Figure 1:
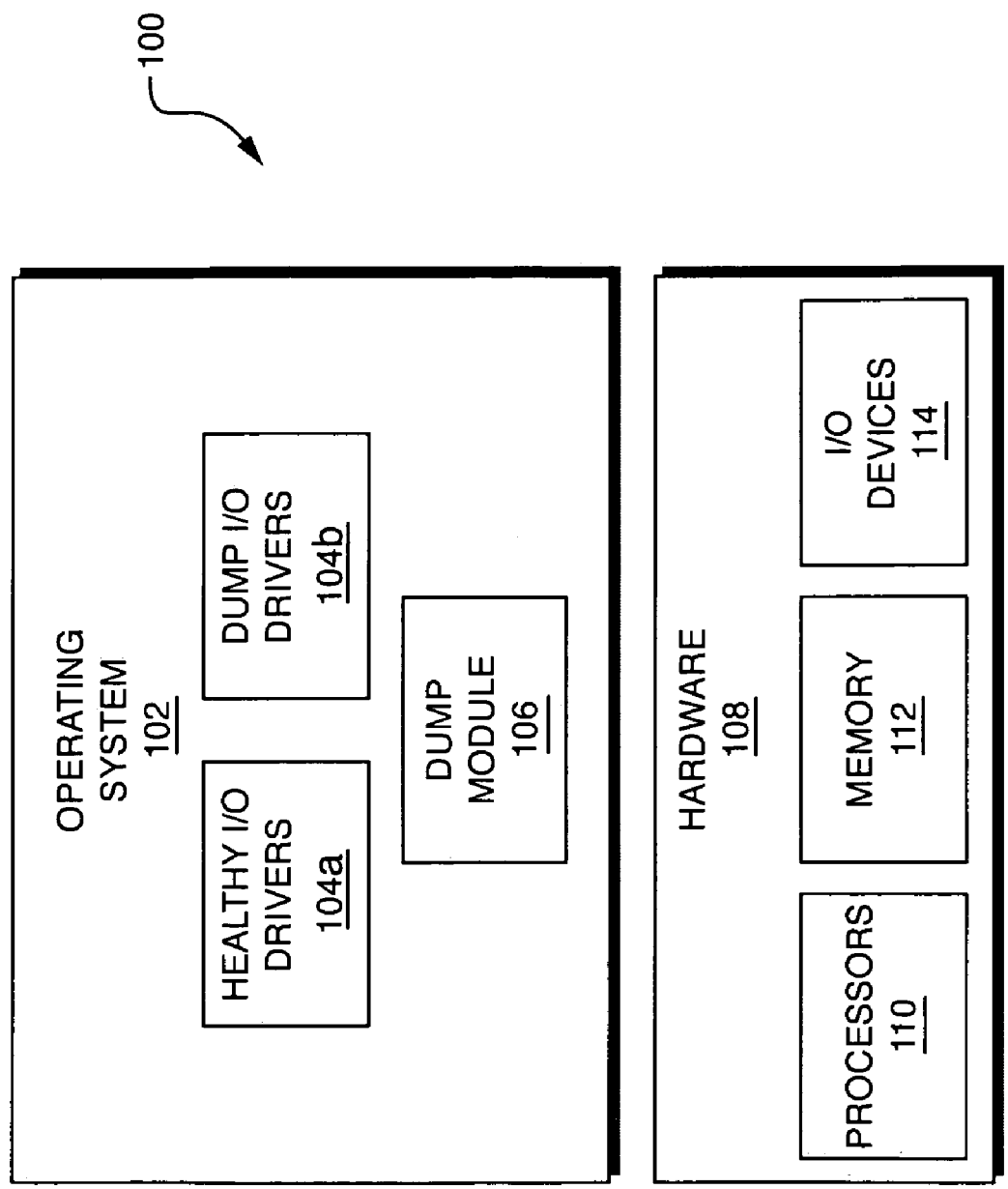
FIG. 1 is a block diagram of a conventional computer including components for performing a memory dump using conventional techniques.
Figure 2A:
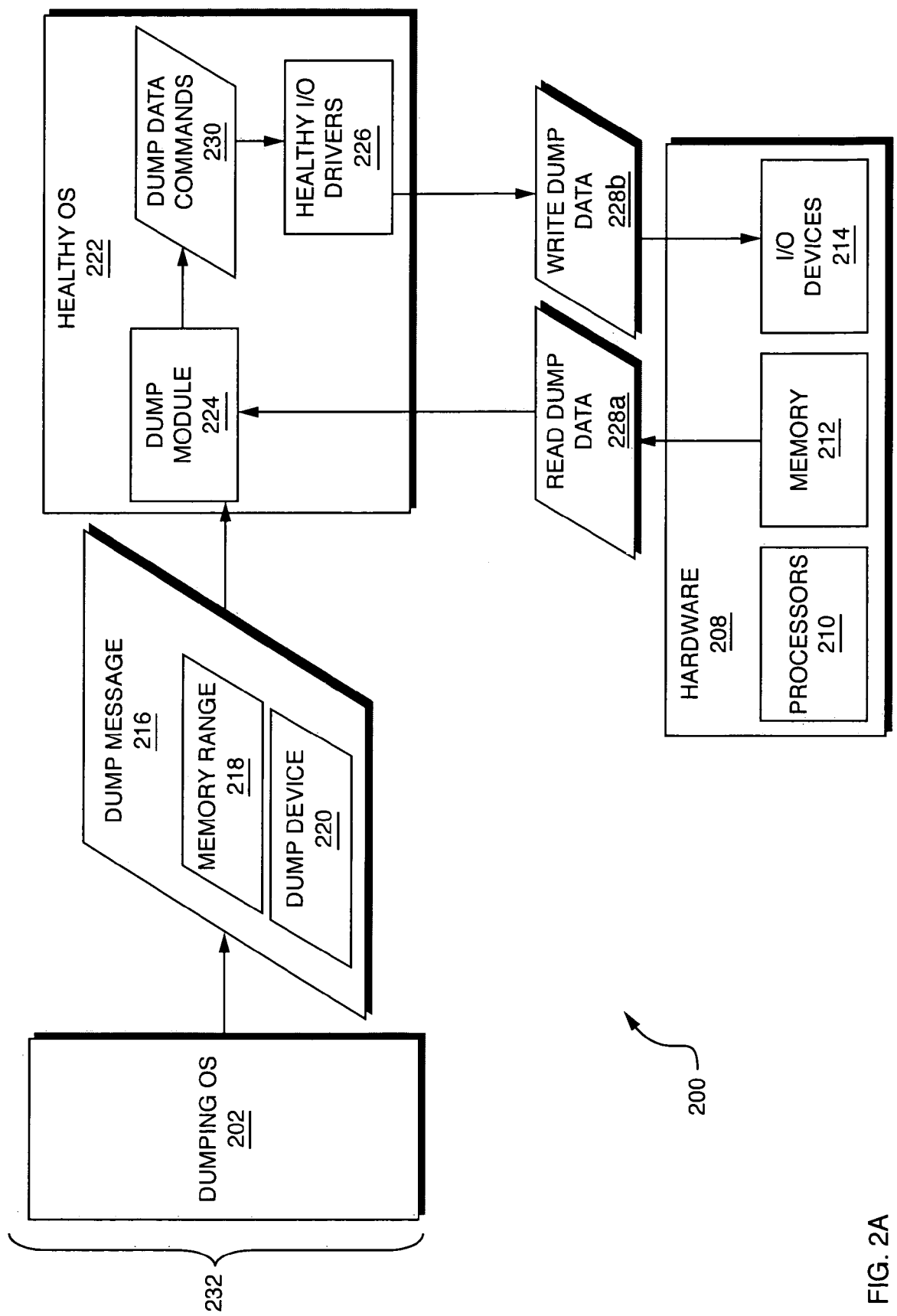
FIG. 2A is a block diagram of a computer according to one embodiment.

Referring to FIG. 2A, a block diagram is shown of a computer 200 according to one embodiment of the present invention. The computer 200 includes an operating system layer 232 and a hardware layer 208. The operating system layer 232 includes a first operating system 202, referred to herein as a "dumping OS" because it experiences an error and initiates a diagnostic memory dump, and a second operating system 222, referred to herein as a "healthy OS" because it remains error-free while the diagnostic memory dump is performed. The hardware layer 208 includes one or more processors 210, a memory 212, and one or more I/O devices 214. The memory 212 may include not only memory chips but also associated controllers and other circuitry. Therefore, the memory 212 may also be referred to herein as a "memory subsystem."

Figure 3:
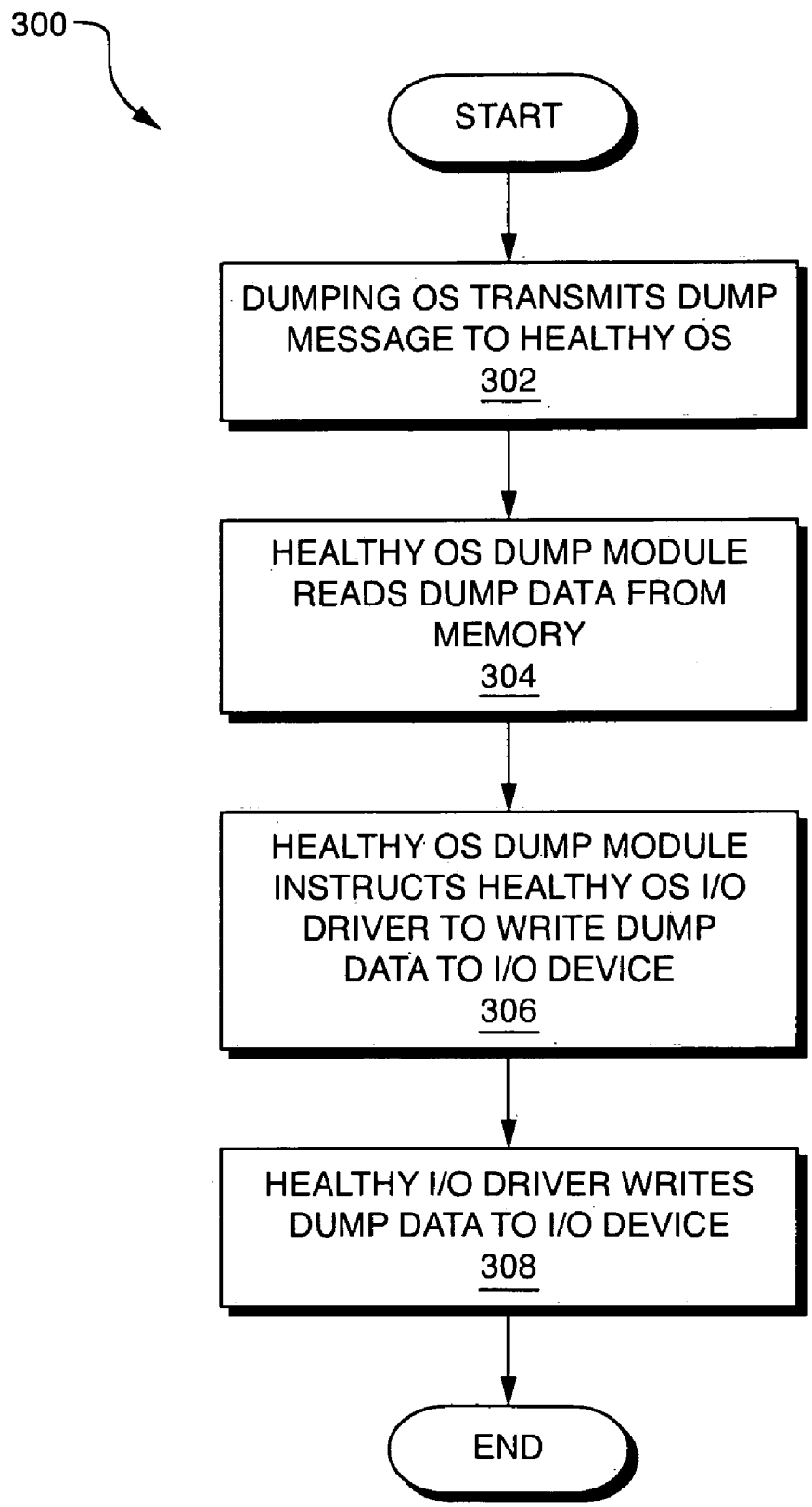
FIG. 3 is a flowchart of a method that is performed by the computers of FIGS. 2A-2B in one embodiment to perform a diagnostic memory dump.

Referring to FIG. 3, a flowchart is shown of a method 300 that is performed by the computer 200 in one embodiment of the present invention to perform a diagnostic memory dump. When the dumping OS 202 experiences a crash or other error, the dumping OS 202 initiates a diagnostic memory dump by transmitting a dump message 216 to the healthy OS 222 (step 302). The dump message 216 includes: (1) a memory range indicator 218, indicating a range of physical memory for which the contents are to be dumped; and (2) an I/O device indicator 220, indicating one of the I/O devices 214 (referred to herein as a "dump device") to which the contents of the specified memory range 218 are to be dumped (written). The memory range indicator 218 may, for example, indicate that all of the memory allocated to the dumping OS 202 should be dumped, or that a subset of such memory should be dumped. The I/O device indicator 220 may, for example, indicate a hard disk drive or other persistent storage device as the dump device.

The healthy operating system 222 includes a dump module 224 for performing a memory dump. The healthy OS 222 also includes a set of I/O drivers 226, referred to herein as "healthy" I/O drivers because they are designed to operate during the normal (i.e., non-error) operation of the operating system 222. Conventional I/O drivers used during the normal operation of a computer are examples of "healthy" I/O drivers, in contrast to the special "dump" I/O drivers 104b designed specifically for use when an operating system has experienced an error. Note that in the embodiment illustrated in FIG. 2A, the healthy OS includes the healthy O/S device drivers 226 and does not include any special "dump" device drivers.

Upon receiving the dump message 216, the dump module 224 in the healthy OS 222 reads dump data 228a in the memory range specified by the memory range indicator 218 from the memory subsystem 212 (step 304). Then the dump module 224 instructs the healthy I/O drivers 226 to write the dump data to the I/O device specified by the dump device indicator 220 (step 306). In response to receiving the write commands 230 (which include the dump data 228a read from the memory 212), the healthy I/O drivers 226 transmit dump data 228b to the I/O device specified by the dump device indicator 220 (step 308). The healthy OS 222 thereby performs a diagnostic memory dump on behalf of the dumping OS 202. Note that the read dump data 228a and write dump data 228b may have the same contents but may be represented in different formats and may be transmitted using different protocols.

The embodiments disclosed above may be applied within various kinds of computer systems. For example, referring to FIG. 2B, a block diagram is shown of a computer 250 according to another embodiment of the present invention. The computer 250 includes an operating system layer 282, a hardware layer 258, and a virtual machine monitor 272 that provides an interface between the operating system layer 282 and the hardware layer 258. Examples of software products that implement virtual machine monitors include the HP-UX Virtual Partitions release A.02.03, available from Hewlett-Packard Company of Palo Alto, Calif., and VMware® Workstation v4.5, available from VMware, Inc. of Palo Alto, Calif. The hardware layer 258, like the hardware layer 208 shown in FIG. 2A, includes one or more processors 260, a memory subsystem 262, and one or more I/O devices 264.

The operating system layer 282 includes a plurality of operating systems 252a-c, referred to herein as "guest" operating systems. The guest operating systems 252a-c may be implemented in a manner that is independent of the implementation details of the hardware layer 258 because the virtual machine monitor 272 provides an interface to the guest operating systems 252a-c that does not vary with changes in the implementation of the hardware layer 258. Therefore, if changes are made to the hardware layer 258, only the virtual machine monitor 272, rather than all of the guest operating systems 252a-c, need be updated to interact correctly to the new hardware layer 258. In this way, the virtual machine monitor 272 provides a platform to the guest operating systems 252a-c in a way that is similar to the way in which the guest operating systems 252a-c provide platforms to application programs (not shown). Therefore, the guest operating systems 252a-c are sometimes said to execute "on" the virtual machine monitor 272, which is itself a kind of operating system.

Assume for purposes of example that the guest operating system 252c experiences an error which necessitates a diagnostic memory dump. Therefore, in the example illustrated in FIG. 2B, the guest operating system 252c is a "dumping OS" as that term is used herein. As will now be described in more detail, the virtual machine monitor 272 may perform the diagnostic memory dump on behalf of the guest operating system 252c. Because the virtual machine monitor 272 may perform a diagnostic memory dump without itself experiencing an error, the virtual machine monitor 272 is an example of a "healthy OS" as that term is used herein.

Figure 2B:
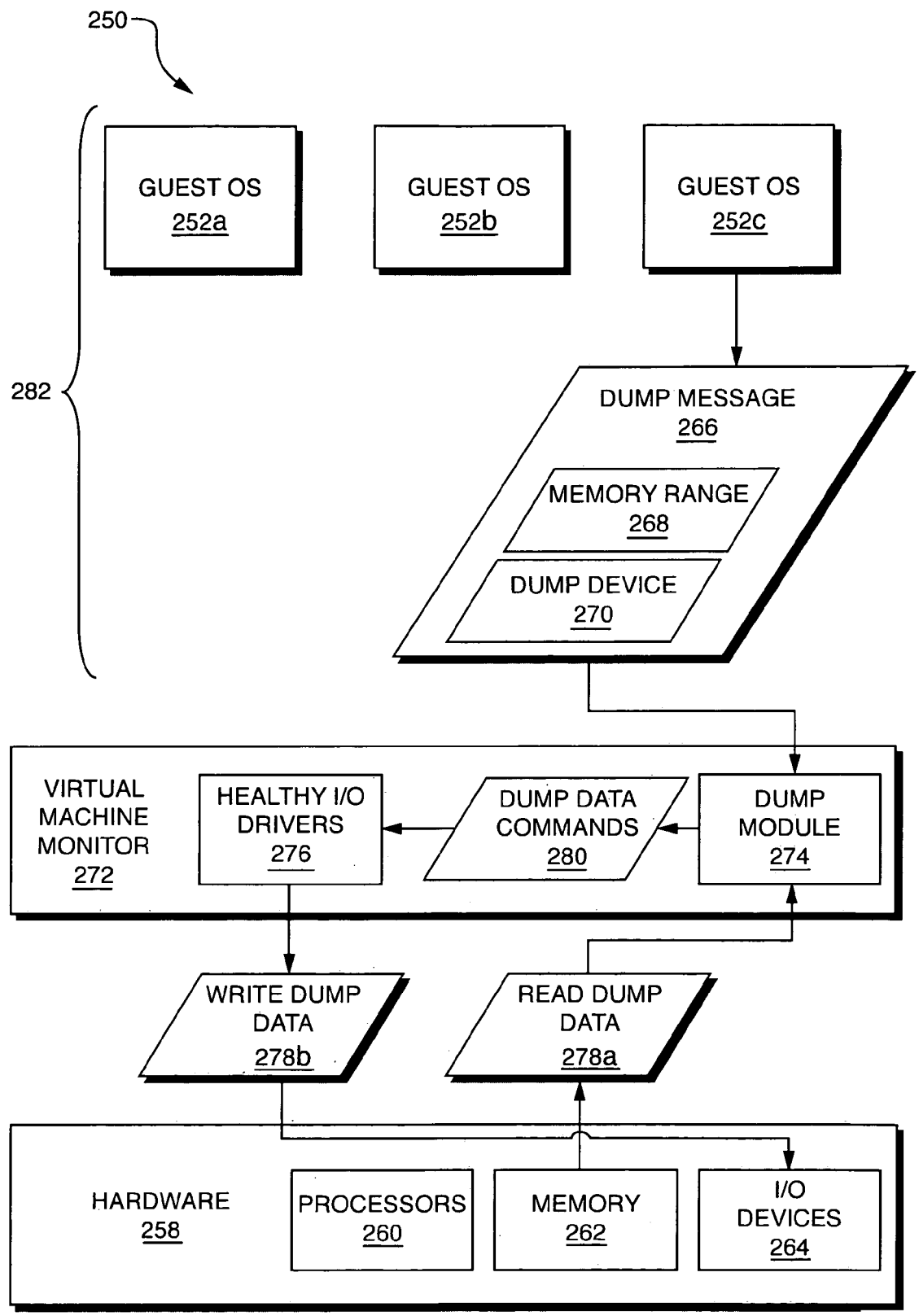
FIG. 2B is a block diagram of a computer according to another embodiment.

The computer 250 shown in FIG. 2B may perform a diagnostic memory dump using the same method 300 shown in FIG. 3. In particular, when the (dumping) guest OS 252c experiences a crash or other error, the guest OS initiates a diagnostic memory dump by transmitting a dump message 266 to the (healthy) virtual machine monitor 272 (step 302). The dump message 266 includes: a memory range indicator 268 and a dump device indicator 270, which may be implemented in the same manner as the indicators 218 and 220, respectively, shown in FIG. 2A.

The virtual machine monitor 272 includes a dump module 274 for performing a memory dump. The virtual machine monitor 272 also includes a set of I/O drivers 276, which are examples of "healthy" I/O drivers because they are designed to operate during the normal (i.e., non-error) operation of the virtual machine monitor 272. Note that in the embodiment illustrated in FIG. 2B, the virtual machine monitor 272 includes the healthy O/S device drivers 276 and does not include any special "dump" device drivers.

Upon receiving the dump message 266, the dump module 274 in the virtual machine monitor 272 reads dump data 278a in the memory range specified by the memory range indicator 268 from the memory subsystem 262 (step 304). Then the dump module 274 instructs 280 the healthy I/O drivers 276 to write the dump data to the I/O device specified by the dump device indicator 270 (step 306). In response to receiving the dump commands 280 (which include the dump data 278a read from the memory 262), the healthy I/O drivers 276 transmit dump data 278b to the I/O device specified by the dump device indicator 270 (step 308). The virtual machine monitor 272 thereby performs a diagnostic memory dump on behalf of the guest OS 252c. The virtual machine monitor 272 may use the same techniques to perform a diagnostic memory dump on behalf of any of the other guest operating systems 252a-b.

Among the advantages of embodiments of the present invention are one or more of the following. In conventional computers, the operating system itself is responsible for performing diagnostic memory dumps. Because diagnostic memory dumps are typically performed in response to an operating system crash or other error, the operating system typically is in an unknown state when it attempts to perform a diagnostic memory dump. The use of the operating system itself to perform a diagnostic memory dump therefore imposes limitations on the reliability and success of the diagnostic memory dump. Embodiments of the present invention, in contrast, use a program separate from the operating system to perform a diagnostic memory dump. Because the separate program has not experienced an error, it may dump memory without experiencing any of the problems which may be caused by being in an unknown state. In short, because the dumping program is healthy, the dump process is more reliable and more likely to succeed.

Conventional techniques for dumping memory require special device drivers that run under constraints imposed by the unknown state of the operating system. Programming such special device drivers can be tedious and time-consuming. Furthermore, such special device drivers operate under constraints imposed by the unhealthy operating system. Furthermore, the driver's spinlocks may have been held at the time of the error, so device drivers 104b cannot assume that the I/O devices 114 are in a known state. The embodiments disclosed herein eliminate the need for special device drivers, since memory dumping may be performed by a healthy operating system which may use normal device drivers to perform memory dumps. Therefore, the embodiments disclosed herein save the cost of developing and maintaining such special device drivers.

Conventional techniques for dumping memory impose constraints on the time at which memory dumping may be performed. For example, existing techniques cannot perform a memory dump very early in the process of loading the operating system because the necessary I/O drivers have not yet been loaded. Such techniques cannot, therefore, perform a memory dump if an error occurs, or if a dump is desired for some other reason, before the necessary I/O drivers have been loaded. The embodiments disclosed herein have no such limitation on the time at which memory dumps may be performed because a healthy operating system may be used to perform a memory dump at any time. In particular, when the embodiments disclosed herein are used, a memory dump can be performed even very early during initialization of the dumping operating system because the healthy operating system and its associated device drivers have already fully loaded.

As the amount of memory in a single computer continues to increase, the amount of time required to dump such memory to a storage device continues to increase. Furthermore, the techniques that currently are used to perform memory dumps impose constraints that limit the speed at which the contents of memory may be dumped. For example, conventional operating systems execute in a single thread when performing a memory dump. The embodiments disclosed herein are not limited by such constraints. For example, when a healthy program (such as another operating system) is used to dump memory, the memory dump may be performed in multiple threads and otherwise take full advantage of all operating system features, thereby enabling the memory dump to be performed more quickly.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The dumping OS (such as the OS 202 or the OS 252c) may communicate with the healthy OS (such as the OS 222 or the virtual machine monitor 272) in any of a variety of ways. Before any such communication occurs, however, the computer may need to enable or disable use of the healthy OS to perform diagnostic memory dumps. This feature may be enabled/disabled by the healthy OS by, for example, passing an argument, indicating whether the healthy OS will perform diagnostic memory dumps on behalf of the dumping OS, to the dumping OS at boot time. Alternatively, for example, the healthy OS may set the value of a predetermined environment variable to indicate whether the healthy OS will perform diagnostic memory dumps on behalf of the dumping OS. When the dumping OS needs a diagnostic memory dump to be performed, the dumping OS may identify the value of the predetermined environment variable. If the value indicates that the healthy OS will perform diagnostic memory dumps on behalf of the dumping OS, then the dumping OS may use the healthy OS to perform the diagnostic memory dump (such as by using the method 300 illustrated in FIG. 3). Otherwise, the dumping OS may attempt to perform the diagnostic memory dump itself using conventional memory-dumping techniques.

The dumping OS and the healthy OS may communicate using any inter-OS or inter-process communication mechanism. Examples of conventional communication mechanisms that may be used include remote procedure calls, shared memory, and host/guest downcall mechanisms. For example, a polling driver may execute in a global shared memory. The polling driver may wait for the dump message and transmit it to the healthy OS when it is detected. Alternatively, the dumping OS may transmit the dump message using a remote procedure call using networking between the two operating systems. Alternatively, any special-purpose communication mechanism may be designed specifically to enable the dumping OS and the healthy OS to communicate with each other. The communications mechanism may allow the dump message to be transmitted as a single message or as multiple messages. The communications mechanism may allow the healthy OS to transmit messages (such as acknowledgement and status messages) back to the dumping OS.

The dump message transmitted from the dumping OS to the healthy OS may have any contents and may be transmitted over any kind of communication channel and using any kind of communication protocol. For example, a memory range indicator may specify a starting address and a number of bytes, thereby specifying a single contiguous range of memory addresses beginning at the start address and running for the specified number of bytes. If there are gaps in the memory to be dumped, or if certain ranges of memory should not be dumped, the memory range indicator may specify multiple non-contiguous blocks of memory to be dumped. In one embodiment of the present invention, the dumping OS transmits multiple memory range indicators to the healthy OS by transmitting a first dump message including the first memory range indicator, waiting for an acknowledgement from the healthy OS that the first dump message has been received, sending a second dump messaging including the second memory range indicator, and so on.

Alternatively, the dumping OS may transmit a memory range indicator or indicators during initialization (e.g., during bootup of the dumping OS) if it is desired that the same memory range(s) be dumped during each diagnostic memory dump. In such a scheme, subsequent dump messages need not include memory range indicators. Similarly, the value of the dump device indicator may be set during initialization. In such a scheme, subsequent dump messages need not include dump device indicators.

Memory contents may be written to the dump device in any of a variety of formats. For example, memory contents may be written in a compressed format or an uncompressed format. The dumping OS may, for example, specify the dumping format in the dump message. Alternatively, for example, the dumping format may be selected by the dumping OS during initialization or by the healthy OS.

As described above, the memory range indicator may specify a range of memory addresses in a physical address space allocated to the dumping OS. The physical address space of the dumping OS may map to a subset of a virtual address space allocated to the healthy OS. In such a case, the healthy OS may need to map the range of physical addresses specified by the memory range indicator into a range of virtual addresses in the virtual address space of the healthy OS. Once this mapping has been performed, the healthy OS may read the contents of the specified memory and write the contents to the dump device using techniques that are well-known to those having ordinary skill in the art.

The "physical memory space" of an operating system refers herein to any memory space allocated to the operating system. If the dumping operating system is allocated the entire memory of the computer (as may be the case in a single-OS system), then the physical memory space of the dumping operating system is coextensive with the entire system memory of the computer.

Although in certain examples disclosed above the program that performs a memory dump on behalf of the dumping operating system is itself an operating system, this is not a requirement of the present invention. Rather, any program that is not part of the dumping operating system may be used to perform a memory dump on behalf of the dumping operating system.

Although in certain examples above the contents of memory are dumped to a single I/O device, this is not a requirement of the present invention. Rather, memory contents may be written to more than one I/O device. For example, memory contents may be written to a first I/O device until that I/O device is full. The remaining memory contents may be written to additional I/O devices.

The memory that is dumped may be any kind of memory. For example, the memory may include one or more RAMs or any other kind of volatile or semi-volatile memory reflecting the state of the computer system at the time the memory dump is initiated.

Although in certain examples described above a memory dump is performed in response to detection of an operating system crash or other error, this is not a requirement of the present invention. Rather, memory dumps may be performed in accordance with embodiments of the present invention for any reason. For example, a memory dump may be performed in response to a user request to perform the memory dump even though the operating system has not experienced an error. This is sometimes done when the operating system appears to be hung, i.e., not making forward progress.

It is desirable for the state of the dumped memory not to change during the dumping process. Therefore, the dumping OS may, for example, rendezvous the processors of the computer to a known state so that the contents of the memory do not change once the dump has been triggered.

Although in certain examples described above, healthy (normal) device drivers are used to perform memory dumps, this is not a requirement of the present invention. Although it may be advantageous to use healthy device drivers to perform memory dumps in certain circumstances, embodiments of the present invention may be implemented using special "dump" device drivers.

The embodiments described above may be implemented, for example, in hardware, software, firmware, or any combination thereof. The embodiments described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A computer-implemented method comprising steps of:
   (A) receiving a memory dump request from a first operating system executing in a computer;
   (B) at a program executing in the computer and not forming a part of the first operating system, copying contents of a memory of the computer to a persistent storage device in response to the memory dump request.

2. The method of claim 1, wherein the program comprises a second operating system executing in the computer.

3. The method of claim 2, wherein the second operating system comprises a virtual machine monitor providing an interface between the first operating system and a hardware layer of the computer.

4. The method of claim 3, wherein the first operating system comprises one of a plurality of guest operating systems executing in the computer.

5. The method of claim 1, wherein the step (B) comprises a step of executing multiple threads in the computer to copy the contents of the memory of the computer to the persistent storage device.

6. The method of claim 1, wherein the first operating system comprises a first device driver for writing to the persistent storage device, and wherein the step (B) is performed after the first operating system has begun loading into the memory of the computer and before the first device driver has loaded into the memory of the computer.

7. The method of claim 1, wherein the program comprises a second operating system including a second device driver for writing to the persistent storage device, and wherein the step (B) is performed using the second device driver.

8. The method of claim 1, further comprising steps of:
(C) at the first operating system prior to the step (A), detecting an error in the first operating system; and
(D) providing the memory dump request to the program in response to detection of the error.

9. The method of claim 1, wherein the first operating system is allocated a physical address space in the memory of the computer, and wherein the step (B) comprises a step of copying the contents of all memory in the physical address space to the persistent storage device.

10. The method of claim 1, wherein the persistent storage device comprises a hard disk drive.

11. An apparatus comprising:
request reception means for receiving a memory dump request from a first operating system executing in a computer; and
dumping means, not forming a part of the first operating system, for copying contents of a memory of the computer to a persistent storage device in response to the memory dump request.

12. The apparatus of claim 11, wherein the dumping means comprises a second operating system executing in the computer.

13. The apparatus of claim 12, wherein the second operating system comprises a virtual machine monitor providing an interface between the first operating system and a hardware layer of the computer.

14. The apparatus of claim 13, wherein the first operating system comprises one of a plurality of guest operating systems executing in the computer.

15. The apparatus of claim 11, wherein the dumping means comprises means for executing multiple threads in the computer to copy the contents of the memory of the computer to the persistent storage device.

16. The apparatus of claim 11, wherein the first operating system comprises a first device driver for writing to the persistent storage device, and wherein the dumping means comprises means for copying the contents of the memory after the first operating system has begun loading into the memory of the computer and before the first device driver has loaded into the memory of the computer.

17. The apparatus of claim 11, wherein the program comprises a second operating system including a second device driver for writing to the persistent storage device, and wherein the dumping means comprises means for copying the contents of the memory using the second device driver.

18. The apparatus of claim 1, wherein the first operating system comprises means for detecting an error in the first operating system; and
wherein the apparatus further comprises means for providing the memory dump request to the program in response to detection of the error.

19. The apparatus of claim 11, wherein the first operating system is allocated a physical address space in the memory of the computer, and wherein the dumping means comprises means for copying the contents of all memory in the physical address space to the persistent storage device.

20. The apparatus of claim 11, wherein the persistent storage device comprises a hard disk drive.

21. A computer system comprising:
a persistent storage device;
a first operating system executing in the computer system, the first operating system comprising first computer program instructions tangibly embodied in a computer-readable medium in the computer to transmit a memory dump request;
a program executing in the computer, the program not forming a part of the first operating system, the program comprising second computer program instructions tangibly embodied in a computer-readable medium in the computer to copy contents of a memory of the computer to the persistent storage device in response to the memory dump request.

22. The computer system of claim 21, wherein the program executing in the computer comprises a second operating system executing in the computer.

23. The computer system of claim 22, wherein the second operating system comprises a virtual machine monitor providing an interface between the first operating system and a hardware layer of the computer.

24. The computer system of claim 23, wherein the computer system further comprises a plurality of guest operating systems executing in the computer system, and wherein the first operating system comprises one of the plurality of guest operating systems.

25. The computer system of claim 21, wherein the program executing in the computer comprises a plurality of threads executing in the computer.

26. The computer system of claim 21, wherein the first operating system comprises a first device driver for writing to the persistent storage device, wherein the second program comprises a second operating system including a second device driver for writing to the persistent storage device, and wherein the second computer program instructions comprise the second device driver.

27. The computer system of claim 21, wherein the persistent storage device comprises a hard disk drive.

* * * * *